Figure 1:
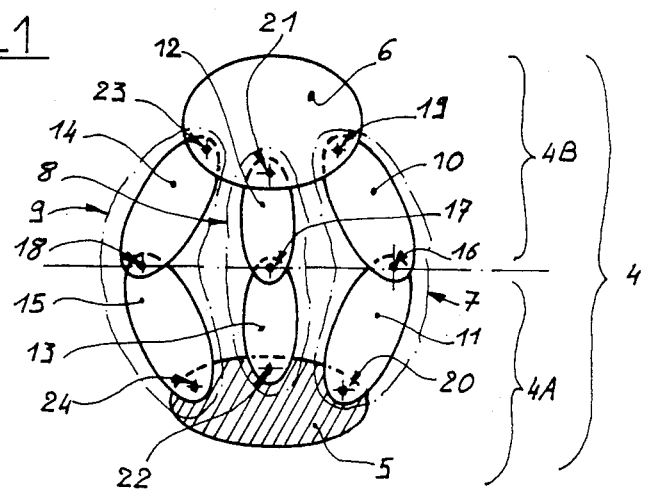

United States Patent [19]
Lambert

[11] Patent Number: 4,651,589
[45] Date of Patent: Mar. 24, 1987

[54] POLYARTICULATED RETRACTILE MECHANISM

[75] Inventor: Michel Lambert, Sains en Amienois, France

[73] Assignee: Societe Bauduin Becart S.A., Thiant, France

[21] Appl. No.: 640,573

[22] Filed: Aug. 14, 1984

[51] Int. Cl.⁴ .................... B25J 1/02; E04H 12/18; E04B 1/344
[52] U.S. Cl. ........................... 74/469; 52/108; 52/111; 52/646; 180/7.1; 248/178; 254/89 H; 901/15; 901/22; 901/28
[58] Field of Search ............ 74/469; 52/1, 2, 108, 52/109, 111, 632, 646; 248/178, 179, 421; 254/89 H; 414/4, 735; 901/15, 28, 29, 22, 25, 26; 180/7.1

[56] References Cited

U.S. PATENT DOCUMENTS

| | | | |
|---|---|---|---|
| 3,215,391 | 11/1965 | Storm | 248/179 X |
| 3,288,421 | 11/1966 | Peterson | 248/179 X |
| 3,606,719 | 9/1971 | Berry | 52/111 X |
| 3,712,481 | 1/1973 | Harwood | 901/28 X |
| 3,794,283 | 2/1974 | Furno | 248/421 X |
| 4,089,147 | 5/1978 | Bain | 52/108 X |
| 4,300,362 | 11/1981 | Lande et al. | 901/28 X |

FOREIGN PATENT DOCUMENTS 422580  9/1974  U.S.S.R. .................. 901/28

Primary Examiner—Allan D. Herrmann
Attorney, Agent, or Firm—Kerkam, Stowell, Kondracki & Clarke

[57] ABSTRACT

The invention provides a retractile polyarticulated mechanism comprising at least one elementary mechanism (4) formed of two endmost pieces (5, 6) one of which is a reference and, for connecting these endmost pieces (5, 6) together at least three legs (7,8,9) situated in separate planes and formed of two parts (10 and 11, or 12 and 13, or 14 and 15) each associated, on the one hand, with the other part forming the same leg by a spherical connection (16, 17 and 18) and, on the other hand, with an endmost piece (5, 6) different from the one with which this other part is associated by a rotoid connection (either 19 or 20, either 21 or 22, or finally 23 or 24).

15 Claims, 13 Drawing Figures

POLYARTICULATED RETRACTILE MECHANISM

The invention relates to a polyarticulated retractile mechanism.

This mechanism forms a connecting structure between two endmost pieces, which finds an application more particularly but not exclusively in the fields:
- of manipulators, such as robot arm or wrist,
- lifting and orientatable platforms such as welding positioners,
- weapon, reflector, antenna supporting turrets,
- extendable coupling joints,
- approach and anchorage devices,
- rigid or deformable erectable structures such as masts and floating barriers,
- clearing devices,
- general purpose vehicles with peristaltic, long stepping or somersaulting locomotion.

Obviously, in all these fields, very many polyarticulated mechanisms already exist forming more or less complex connecting structures between two endmost pieces.

Most of these mechanisms use mainly combinations of elementary connections of prismatic or rotoid type, the component parts being generally assembled only once with the preceding one and with the following one.

The component parts, the connecting members, the actuators and their control systems are always of very different types.

The mechanisms used industrially at the present time have a number of degrees of mobility limited generally to the strict kinematic conditions to be satisfied. In fact, the construction of structures having a high and redundant number of degrees of mobility raise numerous theoretical, practical and economic problems.

A result which the invention aims at obtaining is a retractile polyarticulated mechanism formed from at least one elementary mechanism providing between two endmost pieces a connection with three degrees of mobility which consist in a translational movement and two rotational movements about axes orthogonal to the axis of the translational movement.

Another result which the invention aims at obtaining is such a mechanism for orientating the endmost parts relatively without there being a relative rotation of the sections along the tangents to the mean axis of the structure.

For this, it provides a mechanism of the above mentioned type particularly characterized in that it comprises at least one elementary mechanism formed from two endmost parts, one of which provides a reference system, connected together by at least three legs situated in separate planes and formed from two parts each associated, on the one hand, with the other part forming the same leg by a spherical connection and, on the other hand, with an endmost piece different from the one with which this other part is associated by a rotoid connection.

Figure 2:
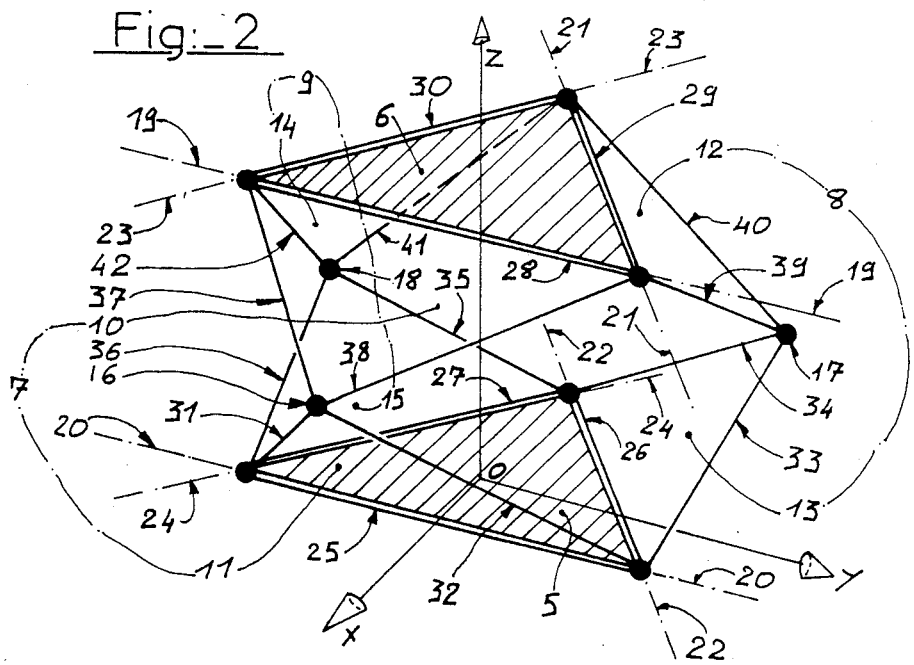
Figure 3:
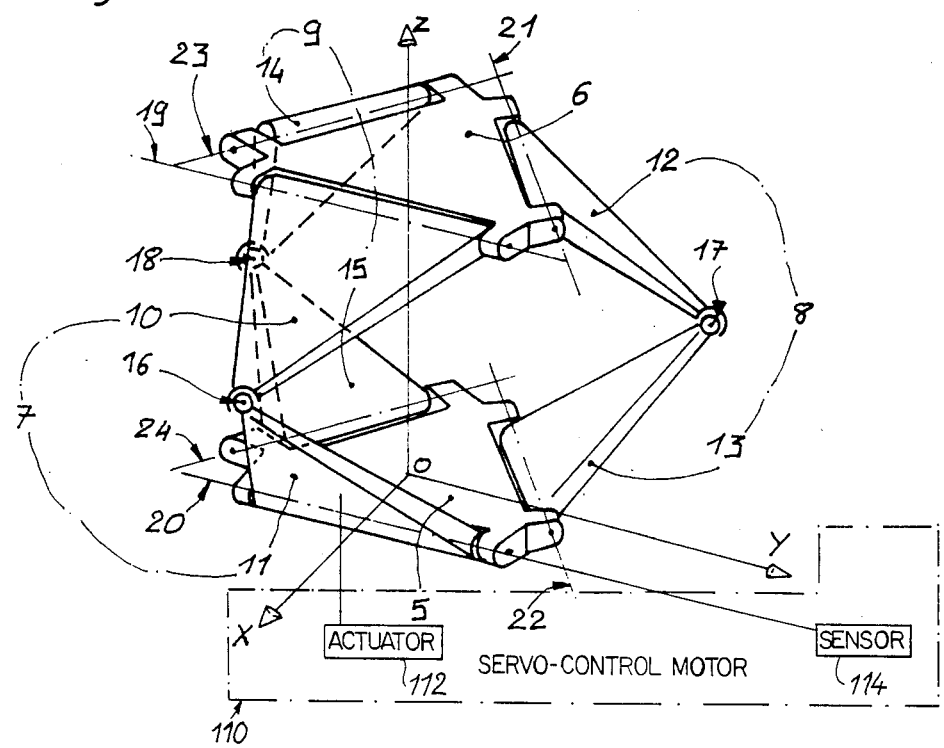
Figure 4:
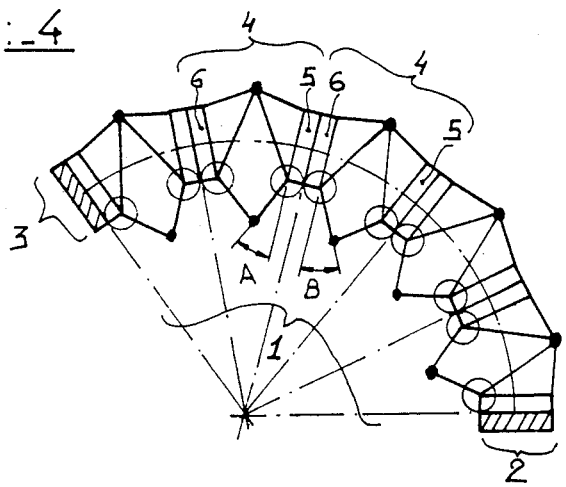
Figure 5:
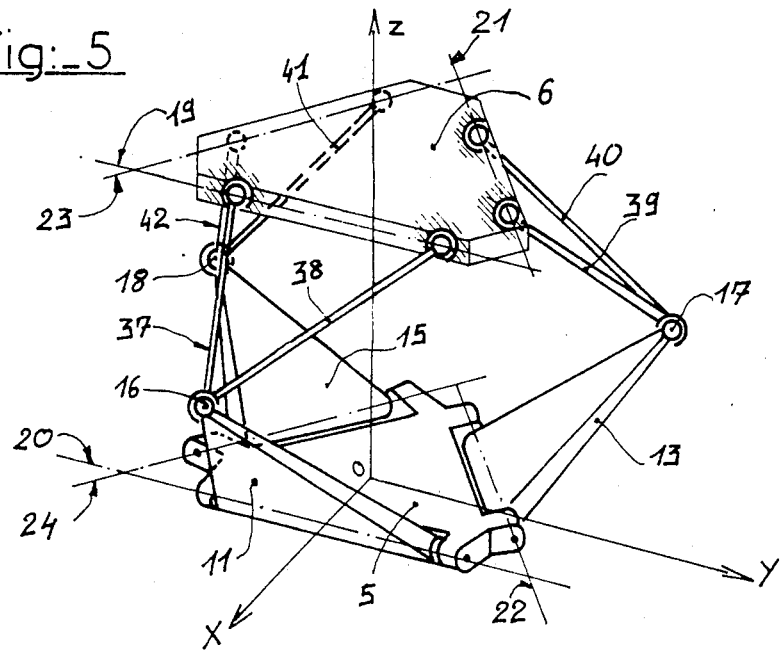
Figure 6:
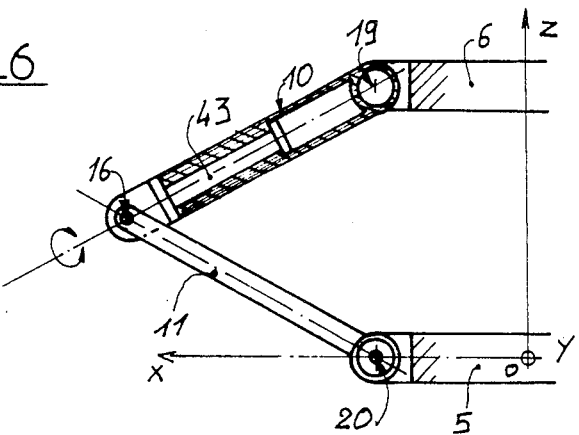
Figure 7:
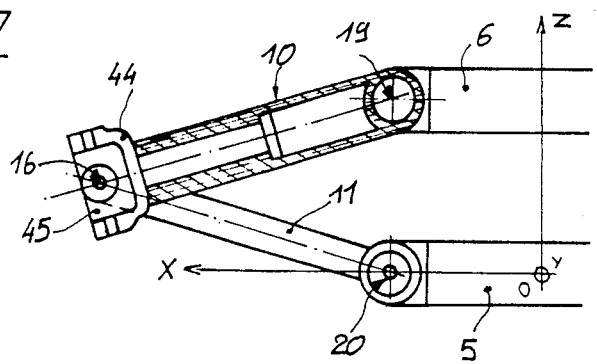
Figure 8:
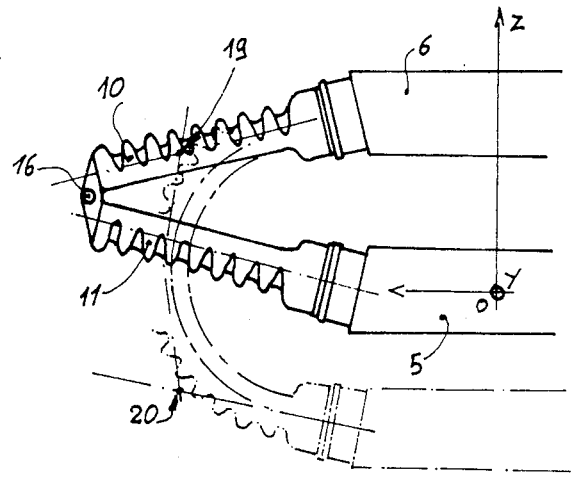
Figure 9:
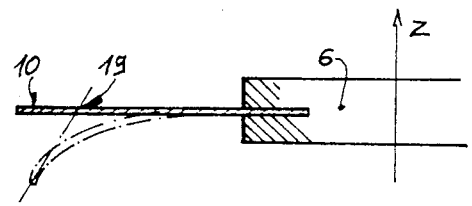
Figure 10:
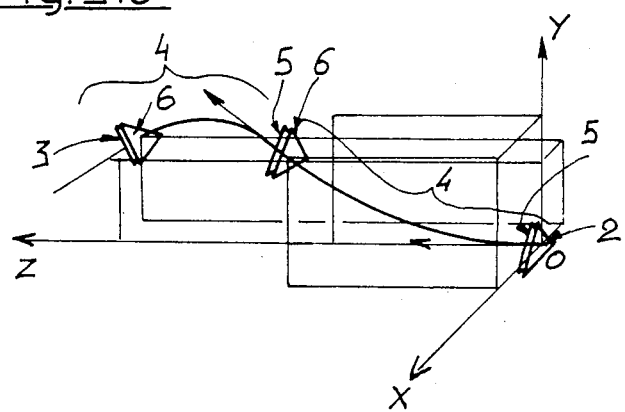
Figure 11:
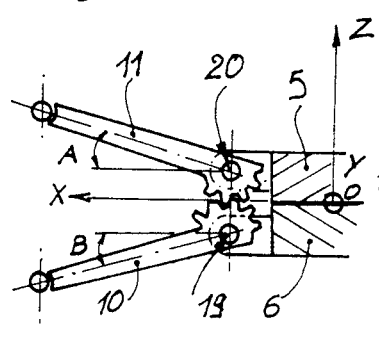
Figure 12:
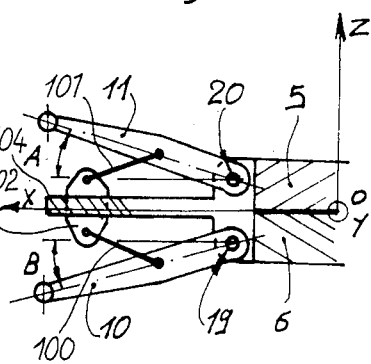
Figure 13:
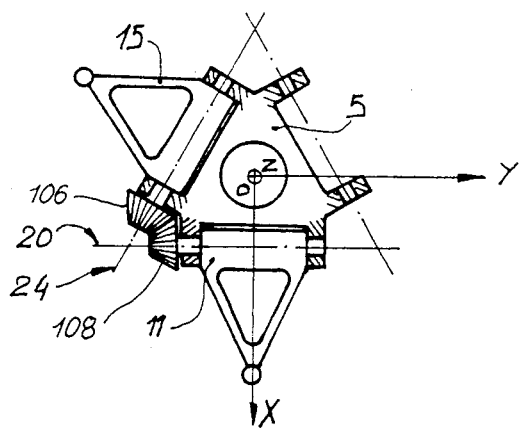

It will be better understood from the following description given by way of non limitative example with reference to the accompanying drawings which show schematically:

FIG. 1: the lay-out graph of an elementary mechanism,

FIG. 2: an elementary mechanism model formed by a reticulate structure,

FIG. 3: a model of an elementary mechanism formed by single piece parts,

FIG. 4: a polyarticulated mechanism formed from several juxtaposed elementary mechanisms, FIG. 5: a model of an elementary mechanism in combined form, FIGS. 6 and 7: variants of a composite connection, as a whole equivalent to a spherical connection, FIG. 8: a variant construction in which the leg uses parts with orientated flexibility, FIG. 9: the diagram of the virtual articulation obtained with the leg shown in FIG. 8, FIG. 10: a polyarticulated mechanism model at the level of its mean axis, FIGS. 11 to 13: different kinematic coupling devices.

Referring to the drawings it can be seen (FIG. 4) that the polyarticulated and retractile mechanism 1 forms a connecting structure between two endmost pieces 2, 3 one of which is taken as reference 2 and that this assembly comprises, either a single elementary mechanism 4, or several of these mechanisms which are advantageously juxtaposed with their endmost parts 5, 6 facing each other either directly or through at least one insert element (not shown).

An elementary mechanism 4 (FIGS. 1, 2 and 3) therefore itself comprises two endmost pieces 5,6, one of which 5 is a reference, connected together by at least three legs 7,8,9 situated in separate planes and formed from two parts 10 and 11 or 12 and 13, or 14 and 15, each associated on the one hand with the other part forming the same leg by a connection at least similar to a spherical connection 16, 17 and 18 and, on the other hand, with an endmost piece 5, 6 different from the one with which this other part is associated by means of a connection at least similar to a rotoid or revolute connection namely 19 or 20, 21 or 22, 23 or 24. A rotoid or revolute connection is characterized in that the connection is a linkage having only one degree of freedom, that is, a rotation about one axis taking place between two parts.

The spherical connections 16, 17 and 18 split up the elementary mechanism 4 effectively into two alternate half elements 4a, 4b (FIG. 1).

The arrangement of the axes of the rotoid or revolute connections 20, 22, 24 or 19, 21, 23 may vary with respect respectively to pieces 5 and 6. However, if the axes of the rotoid or revolute connections 20, 22, 24 or 19 21, 23 at least similar to an endmost piece 5 or 6 are coplanar they cannot all three be parallel.

According to a privileged mode of the invention these axes will be disposed in a symmetry of revolution with respect to an axis belonging to said endmost pieces 5 or 6; In addition, they may be coplanar.

Theoretically, the elementary mechanism 4 may be formed by a reticulate structure (FIG. 2) in which the endmost pieces 5, 6 but also parts 10 to 15 forming legs 7 to 9 all have the shape of triangular structures.

Each of the three bars 25, 26 and 27 or 28, 29 and 30 of the triangular structures forming the endmost pieces 5, 6 merges with one of the three bars 25, 31 and 32 or 26, 33 and 34 or 27, 35 and 36 or 28, 37 and 38 or 29, 39 and 40 or finally 30, 41 and 42 of the triangular structures forming each of parts 10 to 15 forming legs 7 to 9.

The elementary mechanism which has thus been formed theoretically may advantageously have characteristics of symmetry and be formed concretely by very diverse constructional arrangements.

The elementary mechanism may concretely have a shape close to the theoretical model defined in FIG. 3, by using one piece parts 5, 6, 10 to 15 which may be considered as rigid with respect to the forces to which they will be subjected in operation.

In particular, if the forces exerted on parts 10 to 15 forming legs 7 to 9 are only due to connecting actions of an internal kind (proper weights neglected) these parts may be simply rigid in their planes.

The elementary mechanism may concretely have a shape close to the theoretical model defined in FIG. 2, by using, instead of bars 25 to 42, components (not shown) which, in operation, are comparable thereto, whether these components are of a length which is constant or which, by adjustment or controlled deformation, is variable.

The elementary mechanism may concretely have a composite shape derived from the two above described theoretical models where, for example, parts 10 to 15 may as a whole or in part, be formed by bars 31 to 36, 37 to 42 (FIG. 5).

Depending on the amplitude of the mobility and the accuracy required, the connections such as rotoid connections 19 to 24 or spherical connections 16, 17 and 18 may be in the form of articulations using conventional connecting components (bushings, bearings, smooth ball and socket joints etc . . . ) or may use flexible junctions with orientated flexibility.

In the case where, between the endmost pieces 5 and 6, considerable angular movements are required along horizontal axes perpendicular to each other X and Y, it is possible to give to the spherical connections 16, 17 and 18 the form of kinematic coupling joints which are only equivalent to spherical connections, by means of pieces 43, 44 inserted between parts 10 and 11, 12 and 13, 14 and 15 forming the legs.

For example, it will be a question (FIG. 6) of a coupling piece 43 coupled to one of the above mentioned parts by a rotoid connection and to the other part by a smooth ball and socket joint whose center is situated on the axis of the rotoid connection, which provides amplification of the angular movement of the ball and socket joint along the axis of the rotoid articulation. The additional mobility along the axis of the rotoid articulation which the independent rotation of the thus inserted piece 43 constitutes does not influence the overall kinematics of the mechanism.

In another example, it will be a question of two coupling pieces 44 and 45 inserted (FIG. 7) between the parts of the legs so that the three successive connections (first of all between the first leg part and the first of these coupling pieces then between the two coupling pieces 44, 45 and finally between the second coupling piece and the second part 11 of the leg) are of the rotoid type (universal joint mounting), the axes of these three rotoid connections being preferably concurrent although that is not a necessity.

The elementary mechanism may also be given concretely (FIG. 8) a form derived from the model defined in FIG. 3 by using in legs 7 to 9 parts 10 to 15 which are wholly or partially in the form of bendable pieces with orientated flexibility, whose curvature depends substantially on only a single parameter such as inflatable or resilient blade structures.

In such a constructional arrangement where each of the parts 10, 12 and 14 or 11, 13 and 15 forming the legs is in the form of a piece with orientated flexibility, it may be considered that the articulation with a corresponding endmost piece 6 or 5 takes place about a virtual axis 19, 21, 23 or 20, 22, 24 whose position with respect to this same endmost piece depends on the deformation of the part concerned (FIGS. 8 and 9).

As mentioned above, the polyarticulated mechanism may be formed by juxtaposition, through their endmost pieces 5, 6 of any number of elementary mechanisms which, preferably, will be geometrically similar and even have identical dimensions.

With each mechanism 4 having three degrees of mobility, a connecting structure (FIG. 4) which, for connecting two endmost pieces 2, 3 together will be formed from a number "N" of these elementary mechanisms 4, would obviously have a mobility equal to three times the number "N".

In the case where the polyarticulated mechanism results from the juxtaposition in facing relation of several elementary mechanisms 4 by means of their endmost pieces 5, 6, it may be formed at the level of its mean axis by a succession of arcs of a circle of variable radii having common tangents at each connecting point (see FIG. 10 an assembly of two sections).

The kinematic behavior of each elementary mechanism may be independent of that of the adjacent mechanisms or be dependent thereon so that the angle "A" between the plane of one endmost piece 5 or 6 and that of a part 10 to 15 articulated to this endmost piece depends on the angle "B" between the plane of the other juxtaposed endmost piece 6 or 5 and the plane of the corresponding part 10 to 15 articulated to this other endmost piece 6 or 5 (FIGS. 4, 11 and 12).

In order to facilitate this possible kinematic coupling, the endmost pieces 5, 6 through which two elementary mechanisms 4 are juxtaposed, will be advantageously orientated with respect to each other so that the axes of the rotoid articulations 9 to 24 are parallel in twos. In this case, the kinematic coupling of two juxtaposed elementary mechanisms may be provided by conventional flat mechanisms.

FIG. 12 shows a kinematic coupling means of the torque-link type which is well known in the art. Rocker bars 100 are connected between part 10 and a slide block 102 and, similarly, rocker bar 101 is connected between part 11 and sliding block 102. Sliding block 102 is restricted to movement along the X-axis by member 104.

Obviously, such kinematic coupling of at least some of the parts 10 to 15 of at least two adjacent elementary mechanisms reduces the number of degrees of mobility of the whole of the mechanism.

Referring back to FIG. 4, the circles symbolize the kinematic coupling means described above, examples of which are shown in FIGS. 11-13. This symbolic illustration corresponds to the pitch circles of the gears comprising the coupling gears shown in FIG. 11.

To the kinematic coupling of juxtaposed mechanisms may be further added kinematic coupling parts 106, 108 coming into the construction of the same elementary mechanism, for example by means of bevel gears 106, 108 (FIG. 13).

Determination of the parameters defining the geometric state of the overall mechanism may be due to mechanical actions acting from the inside and/or from the outside of the mechanism.

If the mechanical actions which define the geometric state of the overall mechanism act from the inside of the mechanism, they will be exerted by mechanical actuators 112, shown in black box form FIG. 3, acting on component parts of the mechanism, directly or indirectly through transmitters (different mechanisms, linkages, unextendable flexible links held under tension, etc . . . ).

These actuators may be of any known type (linear, rotary, inflatable structure actuators) using any source of energy and operating according to any law of movement.

A particular case will be obtained with actuators whose law of movement during a given period consists in the rest state.

At the level of an elementary mechanism such as 4, the three degrees of mobility may be fixed by three advantageously identical actuators whose action consists for example for each of them in controlling directly or indirectly:

the distance between any two points belonging to the endmost pieces 5 and 6 or the distance between any two points belonging to the two parts of the same leg 7, 8, 9 or the distance between any two points belonging to two parts of different legs, the relative rotation of a leg part 10 to 15 with respect to the corresponding endmost piece 5 or 6.

In the above mentioned case where a leg part 11 is in the form of a structure with orientated flexibility such for example as an inflatable or elastic blade structure, such a piece may be the seat of a physical-chemical phenomenon causing controlled deformation thereof. It may then be considered that such a part is its own actuator.

At a given time, the actuators may be controlled simultaneously or in limited number. They may advantageously be driven by servo-control means 110, shown in dotted black box form in FIG. 3.

In place of or in combination with these actuators the assembly may advantageously comprise movement sensors 114, shown in black box form in FIG. 3 such for example as a potentiometer or an optical coder, the control of which by the articulation of a leg part 10 to 15 with respect to the associated endmost piece 5 or 6 will modify the characteristics of a signal which may be recorded and/or compared with a prior signal or with a reference for driving the actuators.

If the mechanical actions which define the geometric state of the overall mechanism act from outside the mechanism, they may, as was seen above, cause the controlled deformation of some component parts of the mechanism. The same will go for the mechanical actuators or their transmitters.

Such deformability of at least one of the elements formed by these parts and these actuators allows controlled deformation assemblies to be formed.

The assembly thus obtained has numerous advantages:

it is extendable and retractile, at any point of its mean axis it is bendable in all the planes containing the tangent to this mean axis, whence the absence of dead points, its bending amplitude may be increased at will by juxtaposing elementary mechanisms, its elementary mechanisms may be coupled by conventional flat mechanisms, its symmetries reduce the number of types of parts, of assemblies, of actuators, of sensors, the internal symmetry of each elementary mechanism and the juxtaposition of such mechanisms makes the control of a structure having a high number of degrees of mobility relatively simple by using propagative motions;

it offers a favorable scale factor, in fact, from certain dimensions it is possible to form structures comparable to reticulated structures, which is advantageous from the point of view of rigidity and strength with respect to the mass and to the inertia which are reduced; it will moreover be possible to incorporate the actuators in the structure, it imparts no relative rotation of the sections along the tangent to the mean axis, whence the possibility of providing sealing without rotary seal and the possibility of transmitting a torque between the endmost pieces considering the geometrically imposed mean axis; in addition, if the half elements of each elementary mechanism are structurally symmetrical and identical, there will be homokinetism since the sealing offers a hollow central web, cables, pipes may be passed therethrough; for large sizes, the central space may even form a field of intervention.

Because of these numerous advantages, the assembly lends itself to very varied applications, such for example:

as trunks or trunk-wrists used in robot working in which, with the mechanism being retractile and offering a large amplitude of orientation between its endmost pieces, the field of intervention of the mechanism is a volume and allows any curve or surface included in this field of intervention to be described from an axis window of reduced dimensions, as orientatable connection without rotary joint, as homokinetic extendable coupling joint for which the scale factor is favorable, as passive or active approach or anchorage device with controlled deformation, as general purpose vehicles with peristaltic, large striding or somersaulting locomotion for which the proposed mechanism forms an ideal solution not only from the mechanical point of view (spatial kinematics, symmetry of the mobilites, similarity of the component parts, configurable morphology, reduced expenditure of energy) but also from the control point of view (reduced number of parameters manipulated at any time, possible permutation of the orders given to the actuators within each elementary mechanism, propagative motions), as underwater or spatial manipulators; one of the endmost pieces being taken as reference, the other endmost piece may, by means of an appropriate device, grasp an object; the geometric configuration of the mechanism then connecting the object to the reference may be readily determined and a movement may be readily communicated to the object taking certain kinematic constraints into consideration. It is more especially possible to retract the structure along the spatial tunnel which it occupies. Handling of a propagative nature may be provided through the central web (peristaltic) or externally to the structure, as crossing or lifesaving device. Unsinkable inflatable structures could allow personnel to pass into the central web, as erectable masts in which the proposed mechanisms allows extension without relative rotation of the faces and opening out either of all the elements at the same time, or of successive parts beginning by the lower heaviest loaded elements, as lifting and orientatable platforms:

as object supports, more especially in the field of handlers of the positioner type for assembly, welding, finishing operations, etc . . .

as apparatus supports, the translational movement allowing fine approach operations to be carried out (welding post support), as a turret not requiring a fixed angular orientation of the endmost face along the normal (gun, missile, camera, projector, reflector, antenna, radiation sensor, laser, fluid projection or suction jet support turrets).

For such applications, the possibility of continuous lateral rotation without the need for a rotary seal at the level of the base, results in a simplification of the electric, hertzian, optical, fluid connections and sealing devices in a hostile environment. The absence of dead points (possibility of continuous sweeping in two orthogonal elevational planes) and reduced inertia (favorable scale factor) are also advantages.

The translational movement may be used for retracting the apparatus or may be possibly neutralized by an additional bar connecting for example the centers of the endmost pieces together.

I claim:

1. A polyarticulated retractile mechanism (1) forming a connecting structure between endmost pieces (2, 3), one of which is taken as reference, comprising at least one element (4) formed of two end pieces (5, 6), one of which is a reference, and means for connecting these endmost pieces (5, 6) together including at least three legs (7, 8, 9), situated in separate planes and formed of two parts (10 and 11 or 12 and 13 or 14 and 15), each associated on the one hand with the other part forming the same leg by a connection similar to a spherical connection (16, 17 and 18) and, on the other hand, with one of said end pieces (5, 6) different from that with which said other part is associated by a connection similar to a rotoid connection (either 19 or 20, or 21 or 22, or 23 or 24).

2. Retractile polyarticulated mechanism according to claim 1, wherein at least one of the elements formed by the end pieces (5, 6) and the parts (10 to 15) forming the legs (7 to 9) consists of a single piece part (5, 6 and 10 to 15) which may be likened to a rigid part with respect to the mechanical forces to which it is subjected.

3. Retractile polyarticulated mechanism according to claim 1 wherein at least one of the elements formed by the end pieces (5, 6) and the parts (10 to 15) forming the legs (7 to 9) has the form of a triangular reticulated structure whose components consist of means (25 to 42) which in operation may be likened to bars.

4. Retractile polyarticulated mechanism according to claim 1 wherein at least one of the parts (10 to 15) forming the legs (7 to 9) has the form of a bendable structure with orientated flexibility and whose curvature may be considered as depending on only one parameter.

5. Retractile polyarticulated mechanism according to claim 1 wherein said element comprises several elementary mechanisms (4) juxtaposed by the end pieces (5, 6).

6. Polyarticulated mechanism according to claim 5, wherein at least one insert element is disposed between at least some of the elementary mechanisms, said insert being of different structure from said elementary mechanisms.

7. Retractile polyarticulated mechanism according to claim 6, wherein the end pieces (5, 6) face each other.

8. Retractile polyarticulated mechanism according to claim 5 wherein the end pieces (5, 6) face each other.

9. Retractile polyarticulated mechanism according to claim 5 wherein at least one kinematic coupling means is disposed between at least some of said elements (4).

10. Retractile polyarticulated mechanism according to claim 8 wherein the end pieces (5, 6) by which two elements (4) are juxtaposed, are, with respect to each other, orientated so that their respective rotoid articulations (19 to 24) are in parallel pairs.

11. Retractile polyarticulated mechanism according to claim 9 wherein the end pieces (5, 6) by which two elements (4) are juxtaposed, are, with respect to each other, orientated so that their respective rotoid articulations (19 to 24) are in parallel pairs.

12. Retractile polyarticulated mechanism according to claim 1 wherein at least one of said elements (4) comprises an elementary mechanism having at least one kinematic coupling means disposed between further elements interior to said elementary mechanism.

13. Retractile polyarticulated mechanism according to claim 1 further including actuator means for determining the relative positions of the elements formed by the end pieces (5,6) and the parts (10 to 15) of legs (7 to 9) of each element (4).

14. Retractile polyarticulated mechanism according to claim 1, further including sensors for sensing the relative positions of the elements formed by the end pieces (5, 6) and the parts (10 to 15) of legs (7 to 9) of each said element.

15. Retractile polyarticulated mechanism according to claim 14 further including actuators for determining the relative positions of the elements formed by the end pieces (5, 6) and the parts (10 to 15) of legs (7 to 9) of each element and servo-control means connecting the mechanism formed by the actuators and the sensors for controlling the position of the actuators in response to the output of the sensor.

* * * * *